United States Patent

[11] 3,522,753

| | | |
|---|---|---|
| [72] | Inventor: | Artur Schmied<br>Wallisellen, Switzerland |
| [21] | Application No.: | 753,434 |
| [22] | Filed: | Aug. 19, 1968 |
| [45] | Patented: | Aug. 4, 1970 |
| [73] | Assignee: | Contraves AG,<br>Zurich, Switzerland<br>a corp of Switzerland |
| [32] | Priority: | Sept. 1, 1967 |
| [33] | | Switzerland |
| [31] | | No. 12296/67 |

[54] APPARATUS FOR CUTTING FOILS OR THE LIKE
6 Claims, Drawing Figs.

[52] U.S. Cl............................................. 83/471,
83/483, 83/561, 83/71, 90/13, 83/470
[51] Int. Cl.................................................. B23d
19/08, B26d 5/02
[50] Field of Search....................................... 83/12, 71,
471, 477, 483, 561, 562, 646, 647; 90/13.99

[56] References Cited
UNITED STATES PATENTS
1,172,059  2/1916  Scheyer.................... 83/71

3,280,676  10/1966  Grzymislanwski......... 83/12

Primary Examiner— Andrew R. Juhasz
Assistant Examiner— Leon Gilden
Attorney— Werner W. Kleeman ABSTRACT: There is disclosed an apparatus for cutting foils or the like along predetermined cutting lines which incorporates a support table for the foil and a servomotor actuated-cutting device disposed above said support table and movable in two coordinate directions. The cutting device embodies a cutting element which is to be aligned in the cutting direction, this cutting element extending for a certain length in said cutting direction and being relatively thin in a direction transverse to said cutting direction. There is also provided a support for the cutting element. The cutting device further incorporates a body member, a pivot bearing being provided at said cutting device body member and capable of being pivotable by servomotor means about the cutting axis of the cutting device. This pivot bearing is mounted such that its longitudinal axis extends substantially transverse to the plane of the support table, such pivot bearing leading the momentary tangential forward movement of the cutting device. The support for the cutting element is mounted at the pivot bearing for rotation about the transversely extending axis of the pivot bearing.

INVENTOR,
ARTUR SCHMIED

Patented Aug. 4, 1970  3,522,753

INVENTOR,
ARTUR SCHMIED
BY Jacobi & Davidson
ATTORNEYS

INVENTOR,
ARTUR SCHMIED
BY Jacobi & Davidson
ATTORNEYS

U.S. PATENT 3,522,753
APPARATUS FOR CUTTING FOILS OR THE LIKE

BACKGROUND OF THE INVENTION

The present invention relates to an improved apparatus for cutting foils or the like along predetermined cutting lines, which apparatus is of the type encompassing a cutting device movable by servomotor means in two coordinate directions over a support table for the foil. It is to be understood that the term "foil" as employed herein, is used in its broader sense to encompass various types of substantially flat, sheet-like material, formed from paper, cardboard, plastic, sheet metal, or other suitable materials, by way of illustration but not limitation.

Insofar as its basic physical construction is concerned, the inventive apparatus can correspond to a coordinatograph controlled by a programming device for plotting lines of optional shape or configuration upon a drafting sheet, but instead of using a recording device, there is employed a cutting device for cutting out the foil along the predetermined cutting lines.

A primary field of application of such type cutting device is, for instance, the cutting out of patterns for the clothing industry. In so doing, one is concerned with obtaining pattern templates from the model pattern for different sizes and variations of a garment. For this purpose, programmed computers have already been employed, and these pattern templates, on the basis of which the cloth material is cut, are cut out of foil material, for instance, paper, cardboard, plastic and/or sheet metal.

With known prior art cutting devices of the mentioned type, there is provided as the actual cutting element a motor driven end-milling cutter, the axis of rotation of which is controlled in its movement along a predetermined cutting line, and thereby cuts out a slit from the foil material along such cutting line. With this physical construction of prior art machine, the possible cutting speed is practically limited to 1 to 2 cm./second. However, it is desirable to obtain greater cutting speeds, for instance, 6 to 10 cm./second. This objective can be achieved in that, instead of using an end-milling cutter there is employed either a cutting element, for instance a cutting knife or blade, which is aligned or oriented in the cutting direction, extending for a certain length in this direction and which is relatively thin in a transverse direction thereto, a freely rotatable cutting or squeezing roller, or also a motor driven cutting or milling disk. However, such type cutting elements cannot be guided transverse to their cutting plane; in other words, in the presence of the slightest faulty setting or adjustment they tend to deviate from the prescribed cutting line.

SUMMARY OF THE INVENTION

Accordingly, it is a primary object of the present invention to provide an improved apparatus for cutting out foils or the like which effectively overcome the previous drawbacks of the prior art structures.

Another, more specific object of the present invention relates to an improved apparatus for cutting foils at increased operating speeds than heretofore possible, while maintaining accuracy in the movement of the cutting element in order to provide for an exactly desired cutting motion for the cutting element.

Still a further significant object of the present invention relates to an improved apparatus for cutting foils or the like along predetermined cutting lines so as to be able to carry out, with extreme accuracy and reliability, an exactly desired movement of the cutting element, for instance to thereby cut out from the foil a pattern possessing precisely required dimensions.

Now, in order to implement these and still further objects of the invention, which will become more readily apparent as the description proceeds, the previously mentioned cutting apparatus of known character, according to the invention, is generally manifested by the features that the cutting device possesses a cutting element which is to be aligned in the cutting direction, this cutting element extending in the cutting direction over a certain length and being relatively thin in a transverse direction with respect thereto. The support for the cutting element is rotatable about a pivot bearing provided at the cutting device body member. This pivot bearing is mounted to have its axis transverse to the plane of the support table for the foil. Moreover, this pivot bearing lies ahead of or leads the momentary cutting location always in the direction of the momentary tangent of the predetermined cutting line taken at the momentary cutting location and, for this purpose, such pivot bearing is pivotable by servomotor actuation about the cutting axis of the cutting device.

With this combination of inventive features, there is achieved that the cutting location itself, in known manner, is controlled with respect to the prescribed position as a function of both coordinate directions. But, however, for each momentary cutting location, there is also determined the tangential direction at such cutting location, and the cutting device body member is rotated by servomotor actuation about its main axis located at the cutting location in such a manner that the pivot bearing for the support of the cutting element always leads the cutting location in tangential direction. Consequently, the cutting element likewise always remains oriented in the direction of the tangent taken at the cutting line at the momentary cutting location.

Furthermore, the invention advantageously contemplates the provision of a pressure transmission device between the support for the cutting element which is rotatable about the pivot bearing situated ahead of or leading the cutting location and the cutting device body member situated thereover. Such a pressure transmission device can serve, and be constructed, to align the axis extending through the cutting location of the cutting element with the main axis of the cutting device moved by servomotor actuation in both coordinate directions. For this purpose, two recesses provided at the cutting device body member and at the cutting element support, respectively, can be constructed to possess a trough-like or conical configuration, in which there is inserted a pressure transmission ball or spherical member, so that both of these recesses, under the action of the pressure force transmitted by the ball, are always aligned with respect to one another.

BRIEF DESCRIPTION OF THE DRAWINGS

The invention will be better understood, and objects other than those set forth above, will become apparent when consideration is given to the following detailed description thereof. Such description makes reference to the annexed drawings wherein.

DESCRIPTION OF THE PREFERRED EMBODIMENTS

Figure 1:
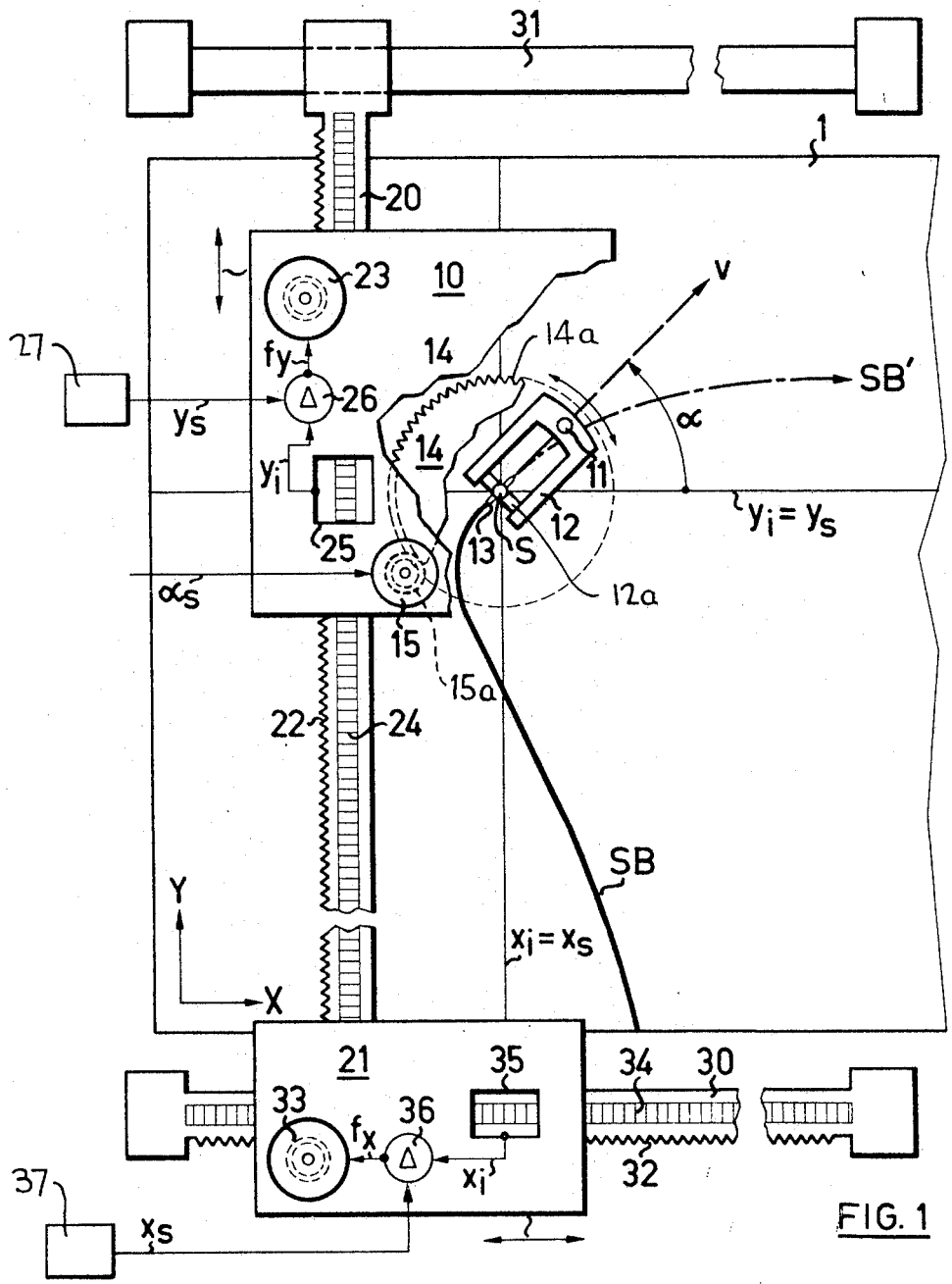
FIGURE 1 schematically illustrates in plan view a first embodiment of inventive cutting apparatus.

Describing now the drawings, according to FIGURE 1 there is shown an exemplary embodiment of inventive cutting device embodying a platform 10 which is displaceably guided upon a transverse beam 20 in the direction of the Y-coordinate axis of a Cartesian coordinate system X, Y. Transverse beam 20, in turn, is displaceably guided for movement in the direction of the X-coordinate axis upon two stationarily mounted lengthwise extending guide beams 30 and 31 which are arranged in parallelism with one another. The transverse beam 20 and the guide beam 30 are each equipped with a gear rack portion 22 and 32 respectively. Furthermore, there are provided servomotors 23 and 33, the respective non-illustrated power takeoff pinions of which are in meshing driving relationship with these gear rack portions 22 and 32, respectively.

As best shown in FIGURE 1, the servomotor 23 is mounted upon the platform 10 of the cutting device, whereas the servomotor 33 is mounted upon a support element or platform 21 of the transverse beam 20. Additionally, the transverse beam 20 as well as also the longitudinal guide beam 30 are each equipped with an appropriate scale means 24 and 34, respectively. Actual value-transmitters 25 and 35 which are mounted upon the platform 10 and transverse beam-support portion 21, respectively, cooperate with these scale means 24 and 34, respectively, for the purpose of automatically continuously determining, in the form of suitable electrical signals, the momentary actual position of the platform 10, that is to say, the momentary spatial or positional coordinates $x_i$, $y_i$ with respect to the zero 21, of the coordinate system x, y. Furthermore, a respective error value-generating device 26 and 36, is arranged upon the platform 10 and the transverse beam-support portion 21 respectively. A respective reference value-transmitter means 27 and 37 transmits the predetermined momentary reference values $y_s$ and $x_s$, respectively, likewise in the form of suitable electrical signals, to the error value-generating devices 26 and 36, respectively. The latter generate or form, also in the form of suitable electrical signals, the momentary error value $f_y = y_s - y_i$ and $f_x = x_s - x_i$, in other words, they form the momentary difference between the reference values and the actual values of the momentary spatial coordinates. These error values $f_y$ and $f_x$ are transmitted in the form of suitable electrical control signals to the servomotors 23 and 33, respectively. Consequently, the platform 10 of the cutting device is moved by servomotor actuation, in known manner, in both coordinate directions in such a way that a reference point S of the platform 10 each time assumes a predetermined programmed position having the coordinates $x_i = x_s$ and $y_i = y_s$, or expressed in a different way, the mentioned reference point S of the platform 10 during the course of a given period of time passes through a prescribed path of travel SB–SB'.

Figure 2:
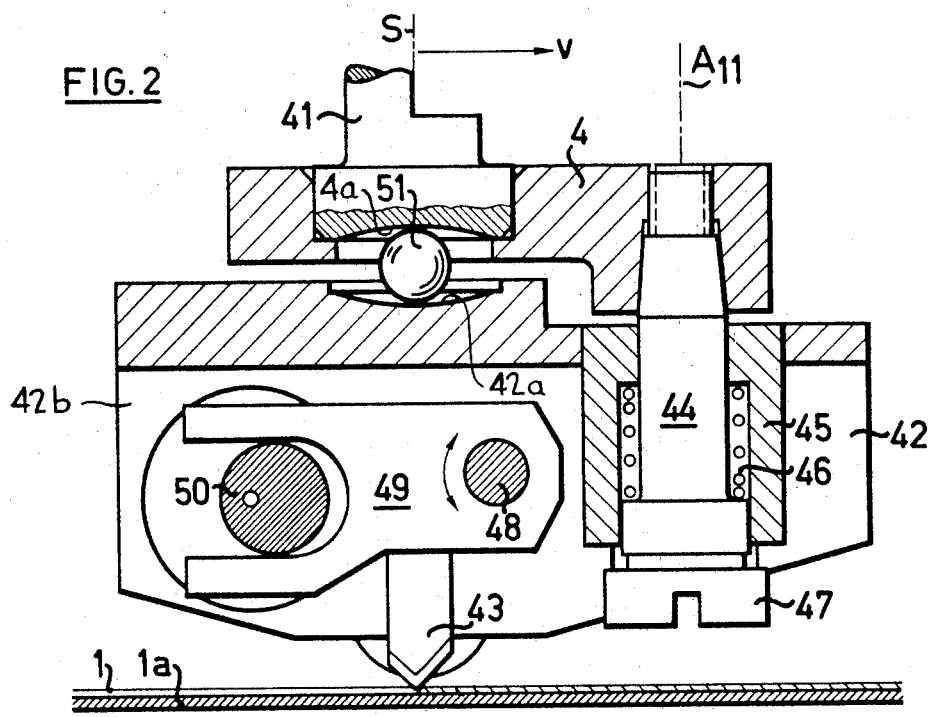
FIGURE 2 is an elevational sectional view of a cutting device equipped with a cutting knife or blade.

Beneath the platform 10 there is situated the foil 1 or the like which is supported upon a suitable support plate or table 1a, as best seen by referring to FIGURE 2. This foil 1 is formed, for instance, from paper, cardboard, plastic or sheet metal, and from which there is cut out a piece along the prescribed path of movement SB of the reference point S of the platform 10.

With known constructions of cutting devices of this character, there is mounted at the reference point S of the platform 10 for instance a motor driven end-milling cutter defining a cutting element which extends transverse to the plane of the foil. Now, according to the illustrated inventive embodiment of cutting device of FIGURE 1, there is provided -- ahead of the point S in the direction of travel of the platform 10 -- a pivot bearing 11 which is situated such that its axis extends transverse to the plane of the foil. This pivot bearing 11 advantageously serves for the rotatable connection of the platform 10 with a support or holder 12 located therebeneath, this support or holder 12 carrying a substantially blade-like cutting element. According to the embodiment of FIGURE 1, this cutting element is a freely rotatably mounted cutting disk 13 arranged at a leg portion 12a of the support or holder 12. This pivot bearing 11 should be pivotable about the mentioned reference point S of the platform 10, and specifically, in a manner such that the connecting line of the reference point S with the axis of the pivot bearing 11 is always parallel to the momentary predetermined tangential direction of movement V of the cutting device.

For this purpose, according to the schematic illustration of the cutting device of FIGURE 1, a gear 14 is mounted at the platform 10 so as to be rotatable about the reference point S. Gear 14 contains the previously mentioned pivot bearing 11 for the support or holder 12 of the cutting disk 13. Now, in order to pivot the pivot bearing 11 by servomotor actuation about the axis taken through the reference point S, there engages with the rim of teeth 14a of the gear 14 the power takeoff pinion 15a of a servomotor 15. To this servomotor 15 there is continuously delivered, in the form of appropriate electrical signals, the reference value $\alpha_s$ of the angle $\alpha$ between the momentary direction of travel V of the platform 10 and the x-direction of the coordinate system. This angle $\alpha$ must always satisfy the condition $\tan \alpha = \Delta y/\Delta x$ of the prescribed path of movement SB of the reference point S of the platform 10. The continuous generation of an angular reference value $\alpha_s$ which always satisfies the aforementioned condition can be derived without difficulty in the transmitter devices for the reference value signals $x_s$, $y_s$. There is illustrated a purely forward control for the servomotor 15 and for the angle $\alpha$. Naturally, steps could be taken whereby the momentary difference between a measured actual value $\alpha$ and the controlled reference value $\alpha_s$ is delivered as a control magnitude to a servomotor. Thus, with the physical construction of apparatus as shown in FIGURE 1, there is achieved that the pivot bearing 11, through the agency of which the support or holder 12 for the cutting roller 13 is freely rotatably connected with the platform 10 of the cutting device and with the gear 14 at the platform 10 rotatable about the reference point S, is rotatable by servomotor actuation about the cutting axis S in such a way that the aforementioned pivot bearing leads the cutting axis S at each instance of time in the direction of the momentary cutting axis S. Consequently, the cutting element 13 which is pulled along in lagging or trailing fashion, has the tendency of acting with a cutting action upon the foil 1 approximately at the prescribed cutting axis S. As a result, the actually performed cutting line SB is produced with greater approximation to the predetermined cutting line SB', and the forward movement of the cutting device can proceed relatively rapidly, for instance in the order of magnitude of 6 to 8 cm./second.

According to FIGURE 2, the cutting device which is moved by servomotor actuation along the prescribed path of travel SB' encompasses a body member 4. At the upper region of this body member 4 there protrudes a pin member 41 by means of which the cutting device can be operatively connected with a device rotatable by a servomotor about the prescribed cutting axis S and moved in the direction of the predetermined path of travel SB. A support 42 for the cutting element, here constructed in the form of a cutting knife or blade 43, is coupled with the body member 4 through the agency of a pivot bearing 44. This pivot bearing 44, as required, has its axis of rotation $A_{11}$ always leading the provided cutting axis S in the direction of the momentary tangential feed. This pivot bearing 44 also embodies an insertable bushing or sleeve 45 provided at the support 42, a helical spring 46 and a tensioning or tightening screw 47 for selectively biasing or stressing spring 46. A further body member 49, serving as the actual support or carrier for the cutting knife or blade 43, is mounted to be adjustable with precision through the agency of an associated rotatable eccentric disk 50. This cutting element-adjustment body member 49 is arranged in a longitudinal slot 42b of the support body 42 and is seated upon a horizontal pin or shaft 48. This body member 49 for the cutting knife or blade 43 is thus accurately adjustable in such a way that the cutting knife 43 or the like can assume the most favorable elevational position.

Additionally the embodiment of FIGURE 2 is constructed such that a pressure force exerted in the direction of the axis S of the pin member 41 upon the body member 4 is transmitted via a ball or sphere 51 to the support 42 for the knife or blade 43. This ball or sphere 51 is inserted in substantially trough-like recesses 4a and 42a provided at the underside of the body 4 and at the upper surface of the support 42, respectively, so that during such time as it transmits the pressure force it strives to adjust the cutting axis of the cutting knife 43 along the central axis of the pin member 41, yet still permits slight deviations of this axis. As previously mentioned, the foil 1 or the like which is to be cut by the knife or blade 43 is supported upon a sheet metal or plastic plate 1a providing a foil-support table means.

Figure 3:
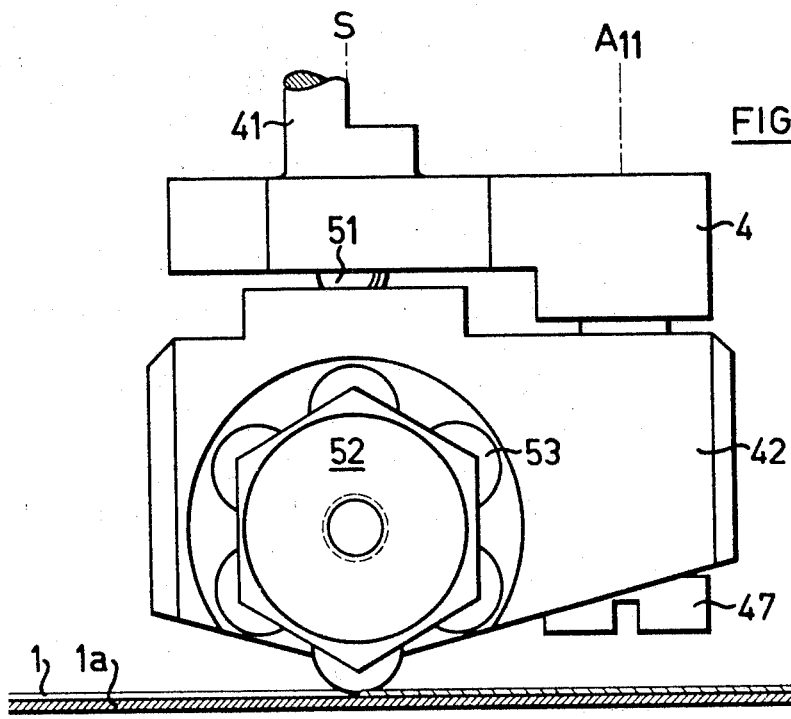
FIGURE 3 is a side view, similar to FIGURE 2, of a cutting device equipped with a plurality of small cutting rollers rotatably mounted in a magazine disk.

According to the variant embodiment of FIGURE 3, there is provided in place of the knife or blade 43, a magazine wheel 52 at the support body 42. This magazine wheel 52 is advantageously equipped with a number of small cutting rollers 53 rotatably mounted within the magazine wheel 52. In fact, these small cutting rollers 53 are mounted and arranged in the magazine wheel 52 in such a fashion that after one of these cutting rollers 53 has become dull the magazine wheel 52 can easily be rotated or indexed in order to bring into an effectual position a new cutting roller 53.

Figure 4:
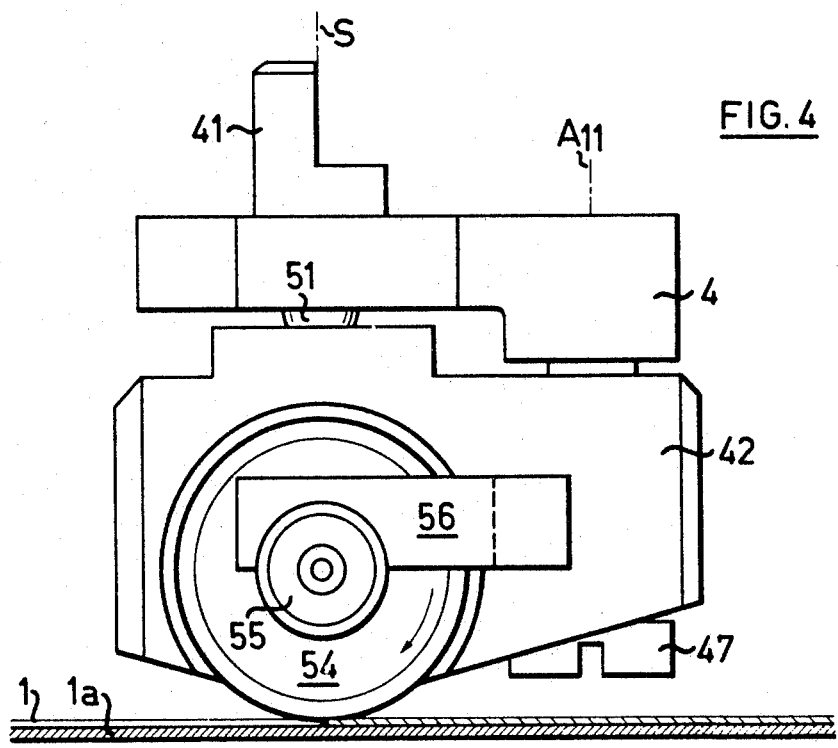
FIGURE 4 is an elevational view of a cutting device having a motor driven-cutting disk.
Figure 5:
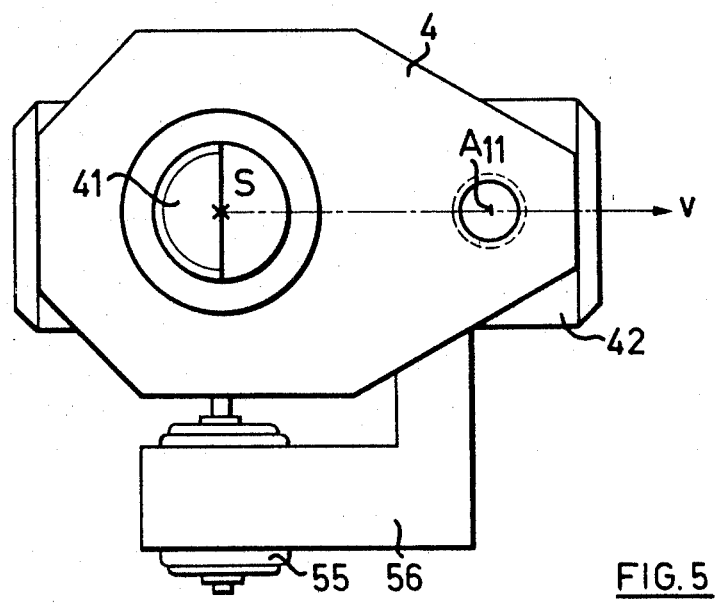
FIGURE 5 is a plan view of the cutting device depicted in FIGURE 4.

Finally it should be mentioned that in the embodiment according to FIGURES 4 and 5 there is provided at the support body 42, a knife disk 54 of relatively large diameter which defines the cutting element. This knife disk 54 is driven by a suitable drive motor 55, or equivalent structure, secured to a yoke 56 or the like. The knife disk 54 can be also constructed to possess teeth or as a disk miller or cutter.

It should be apparent from the foregoing detailed description that the objects set forth at the outset to the specification have been successfully achieved.

I claim:

1. Apparatus for the cutting of foils or the like along predetermined cutting lines comprising in combination, a support table for the foil, a servomotor actuated-cutting device disposed above said support table and mounted to be movable in two coordinate directions, said cutting device incorporating a cutting element which is to be aligned in the cutting direction, said cutting element extending for a certain length in said cutting direction and being relatively thin in a direction transverse to said cutting direction, a support for said cutting element, said cutting device further incorporating a body member, a pivot bearing provided for said cutting device body member and capable of being pivoted by servomotor means about the cutting axis of the cutting device, said pivot bearing being mounted to have its longitudinal axis extending substantially transverse to the plane of said support table, said pivot bearing leading the momentary tangential forward movement of the cutting device, said support for said cutting element being mounted at said pivot bearing for rotation about said transversely extending axis of the pivot bearing.

2. Apparatus for the cutting of foils or the like along predetermined cutting lines as defined in claim 1, further including pressure transmission means for pressing the cutting device against the foil disposed upon the support table, said pressure transmission means being mounted between said rotatable support and said cutting device body member.

3. Apparatus for the cutting of foils or the like along predetermined cutting lines as defined in claim 2, wherein said pressure transmission means incorporates mechanism constructed and arranged to insure that the cutting axis of the cutting element taken through the cutting location is aligned with the main axis of the cutting device moved by servomotor actuation in both coordinate directions.

4. Apparatus for the cutting of foils or the like along predetermined cutting lines as defined in claim 1, wherein said cutting element comprises rotatable and motor driven-cutting disk means.

5. Apparatus for the cutting of foils or the like along predetermined cutting lines as defined in claim 1, wherein said cutting element comprises a magazine incorporating a number of separate cutting rollers, each of which can be rotated into an effectual position to bring a new sharp cutting roller into operable relationship with the foil to be cut.

6. Apparatus for the cutting of foils or the like along predetermined cutting lines as defined in claim 1, further including servomotor means for rotating said pivot bearing so as to assume a predetermined angular position.